US011477294B2

(12) United States Patent
Correa Azzolin et al.

(10) Patent No.: US 11,477,294 B2
(45) Date of Patent: Oct. 18, 2022

(54) SPATIAL-TEMPORAL LIMITED USER SESSIONS

(71) Applicant: Hewlett-Packard Development Company, L.P., Spring, TX (US)

(72) Inventors: Deny Joao Correa Azzolin, Vancouver, WA (US); Laurent Pizot, Vancouver, WA (US); Roger S. Twede, Boise, ID (US); Joseph Yang, Cypress, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/298,559

(22) PCT Filed: Apr. 26, 2019

(86) PCT No.: PCT/US2019/029455
§ 371 (c)(1),
(2) Date: May 29, 2021

(87) PCT Pub. No.: WO2020/219079
PCT Pub. Date: Oct. 29, 2020

(65) Prior Publication Data
US 2022/0046099 A1 Feb. 10, 2022

(51) Int. Cl.
*H04L 67/148* (2022.01)
*H04L 9/32* (2006.01)
(Continued)

(52) U.S. Cl.
CPC .......... *H04L 67/148* (2013.01); *H04L 9/3213* (2013.01); *H04L 63/10* (2013.01); *H04L 67/306* (2013.01)

(58) Field of Classification Search
CPC ..... H04L 67/148; H04L 9/3213; H04L 63/10; H04L 67/306
See application file for complete search history.

(56) References Cited

U.S. PATENT DOCUMENTS 8,413,210 B2   4/2013   Kuzin et al.
9,001,370 B1   4/2015   Nuggehalli
(Continued)

FOREIGN PATENT DOCUMENTS

WO   WO-2014210203 A1   12/2014
WO   WO-2017213808 A1   12/2017
WO   WO-2019079826 A1    4/2019

OTHER PUBLICATIONS

Using OAuth 2.0 to Access Google APIsir 1—15 Mar. 21, 2016 (Mar. 21, 2016), pp. 1-8, XP055416907, Retrieved from the Internet: URL: https://web.archive.org/web/201 60321094923/https://developers google.com/identit.
(Continued)

*Primary Examiner* — David R Lazaro
(74) *Attorney, Agent, or Firm* — Michael Dryja

(57) ABSTRACT

A method comprises receiving, at a server from a communications-enabled device that includes processing circuitry, a request for providing a user session correlated with a user identifier (ID) and a target appliance. The method further includes in response to the request for the requested user session: retrieving a user attribute from a user-ID database that stores user ID information for a plurality of user accounts, and retrieving an appliance attribute from an appliance-ID database that stores appliance ID information; and correlating the retrieved user attribute and appliance attribute with the requested user session for a user account from among the plurality of user accounts. The method further includes transferring the requested user session to the target appliance as a new user session that is spatial-temporal limited and that is without the target appliance using user login information.

15 Claims, 5 Drawing Sheets

(51) Int. Cl.
*H04L 9/40* (2022.01)
*H04L 67/306* (2022.01)

(56) References Cited

U.S. PATENT DOCUMENTS

| | | | |
|---|---|---|---|
| 10,262,210 | B2 | 4/2019 | Kirkby et al. |
| 2003/0217159 | A1 | 11/2003 | Schramm-Apple et al. |
| 2012/0324242 | A1 | 12/2012 | Kirsch |
| 2013/0179961 | A1 | 7/2013 | Abe |
| 2013/0222837 | A1 | 8/2013 | Watanabe |
| 2013/0268999 | A1 | 10/2013 | Kiang et al. |
| 2014/0068261 | A1 | 3/2014 | Malek et al. |
| 2014/0101434 | A1 | 4/2014 | Senthurpandi et al. |
| 2014/0331060 | A1 | 11/2014 | Hayton |
| 2014/0340717 | A1 | 11/2014 | Meiyappan |
| 2014/0372514 | A1 | 12/2014 | Doui |
| 2015/0222517 | A1* | 8/2015 | McLaughlin ....... H04L 63/0435 713/171 |
| 2015/0350204 | A1 | 12/2015 | Wang et al. |
| 2016/0219098 | A1 | 7/2016 | Baca et al. |
| 2016/0261411 | A1 | 9/2016 | Yau et al. |
| 2017/0195328 | A1* | 7/2017 | Chitti ................... H04L 63/083 |
| 2017/0223005 | A1 | 8/2017 | Birgisson et al. |
| 2017/0272316 | A1 | 9/2017 | Johnson et al. |
| 2017/0303129 | A1* | 10/2017 | Boettcher ............. H04W 12/08 |
| 2022/0046099 | A1* | 2/2022 | Correa Azzolin .... H04L 67/306 |

OTHER PUBLICATIONS

D Hardt: "RFC 6749 The OAuth 2.0 Authorization Framework", 1—15 Oct. 31, 2012 (Oct. 31, 2012), pp. 1-76, XP055218558, Retrieved from the Internet: URL:https://www rfc-edito.

John Clark et al: "A Survey of Authentication protocol Literature: Version 1.0", Internet Citation, Nov. 17, 1997 (Nov. 17, 1997), pp. 1-109, XP002565102.

Neuman USC—ISI T Yu S Hartman K Raeburn MIT C: "The Kerberos Network Authentication Service (V5) rfc4120.txt", The Kerberos Network Authentication Service (V5)?; RFC4120.txt, Jul. 2005.

Phillip L Hellewell et al: "Extensible Pre—authentication Kerberos", Computer Security Applications Conference, 2007. ACSAC 2007. Twenty-Third Annual, IEEE, Dec. 1, 2007.

* cited by examiner

SPATIAL-TEMPORAL LIMITED USER SESSIONS

BACKGROUND

Appliances, such a printing device, may transmit beacons having a unique identifier of the appliance for being shared with other user devices. The user devices, such as cell phones and other personal user devices, may establish a user session with the appliance using data in the beacon and to execute commands sent by the user device.

An ongoing trend in various businesses is to share resources, such as computer servers, appliances, and office space, to reduce support and maintenance. Various appliances may not allow for the user to remotely access the appliance and view output on a local display. For example, a printing device that is shared produces hardcopy outputs which may have confidential information which should not be shared by others without authorization.

BRIEF DESCRIPTION OF FIGURES

Various examples may be more completely understood in consideration of the following detailed description in connection with the accompanying drawings, in which.

Figure 1:
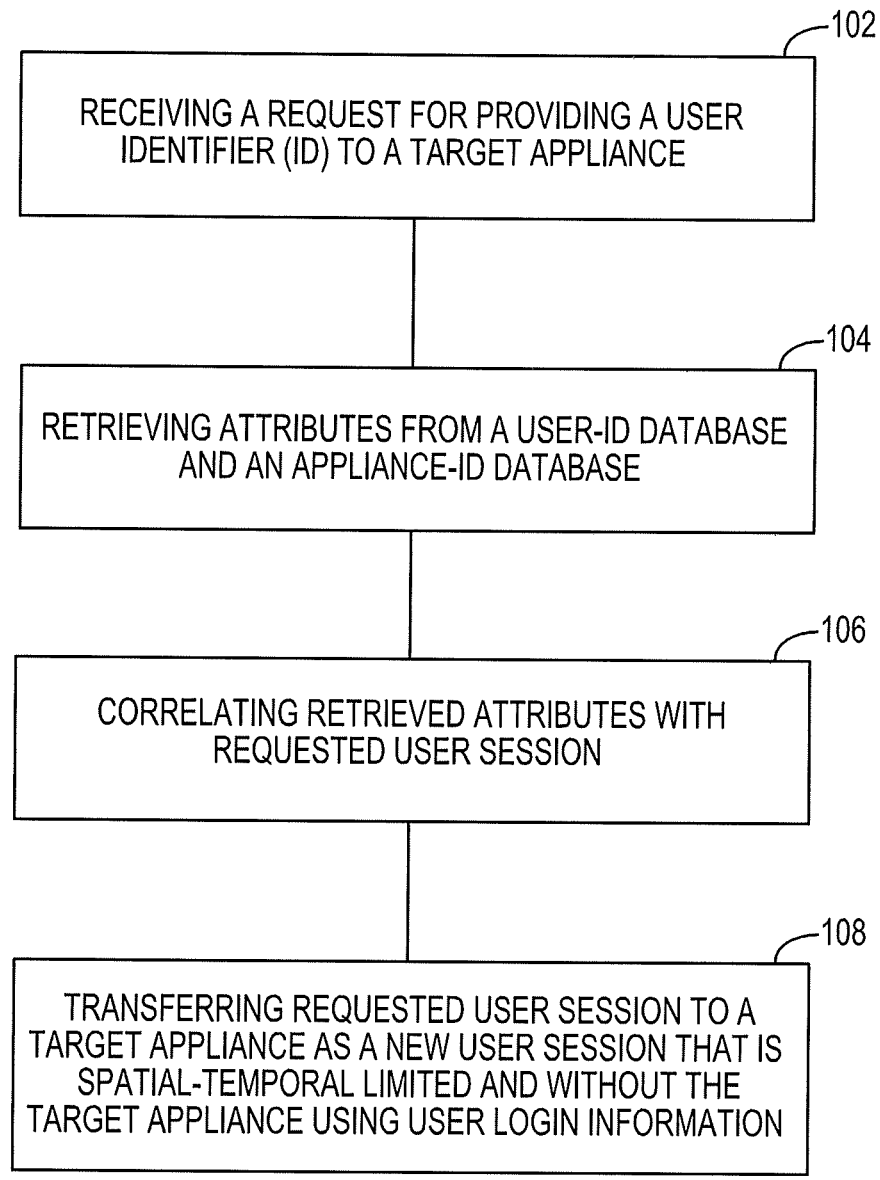
FIG. 1 illustrates an example method for transferring a spatial-temporal limited user session, in accordance with the present disclosure.

While various examples discussed herein are amenable to modifications and alternative forms, aspects thereof have been shown by way of example in the drawings and will be described in detail. It should be understood, however, that the intention is not to limit the disclosure to the particular examples described. On the contrary, the intention is to cover all modifications, equivalents, and alternatives falling within the scope of the disclosure including aspects defined in the claims. In addition, the term "example" as used throughout this application is by way of illustration, and not limitation.

DETAILED DESCRIPTION

Aspects of the present disclosure are believed to be applicable to a variety of different types of apparatuses, systems and methods involving spatial-temporal limited user session between a communication-enabled device and a target appliance. In certain implementations, aspects of the present disclosure have been shown to be beneficial when used in the context of the server that acts as a bridge between databases storing identifying and verification information of a user account and the target appliance. In some examples, the target appliance is provided access to user data of the user account without being registered on or otherwise directly communicating with the database storing the identifying and verification information of the user account. While not necessarily so limited, various aspects may be appreciated through the following discussion of non-limiting examples.

In the following description various specific details are set forth to describe specific examples presented herein. However, other examples and/or variations of these examples may be practiced without all the specific details given below. In other instances, features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or example may be combined with features of another figure or example even though the combination is not explicitly shown or explicitly described as a combination.

Consumers are increasingly interested in appliances, such as printers, copiers, thermostats, refrigerator, and multifunction devices, that are smart devices having remotely-accessed and/or programmable functionality such that a user may activate different features or otherwise establish a user session with the appliance. Users may login to each respective appliance, against a known user identifier (ID) database using a manually established user account on each appliance and/or when the appliances is set up or registered. When established at registration, the ownership or user session is established for an arbitrary time. Examples in accordance with the present disclosure allow for a user to login to one user device, such as a communications-enabled device, and to transfer their identity to other appliances without logging in again to the appliance and without the appliance being a trusted device of the user ID database. A user session on the appliance is established that is spatial-temporal limited and the appliance may assume the identity of multiple users at overlapping times.

In accordance with various examples, a server provides a bridge between two disparate databases and to provide a user session to a target appliance that is spatial-temporal limited. For example, the server receives a request for providing a user session correlated with a user ID and a target appliance from a communications-enabled device. The communications-enabled device includes a device having processing circuitry and communication circuitry for communicating, such as a smartphone, a tablet, a laptop, a smartwatch and other user devices. The target appliance includes a processing circuitry for providing various functions and communication circuitry for communicating with other devices. Example appliances include a printer, a washer, a dryer, a refrigerator, a home surveillance system, a thermostat, etc. In response to the request for the user session, the server retrieves a user attribute from a user-ID database and an appliance attribute from an appliance-ID database. The user-ID database stores user ID information for a plurality of user accounts, such as information for verifying legitimacy of a user and/or trusted devices correlated with the user. The appliance-ID database stores appliance ID information, such as information for verifying legitimacy of an appliance. The retrieved user attribute and appliance attribute are correlated with the requested user session for a user account among the plurality of user accounts of the user-ID database. The server transfers the requested user session to the target appliance as a new user session that is spatial-temporal limited and that is without the target appliance using the user login information. For example, the target appliance is provided authorization to access data in the user account correlated with the user ID that is limited in time and/or a distance between the target appliance and the communications-enabled device.

As a specific example, a user logins into an application program running on their smartphone, which authorizes and authenticates the user and/or smartphone. By logging in using a user ID, it is verified that user participates on a user ID database. At the same or a different time, a target appliance, which is a printing device, participates on an appliance ID database that validates legitimacy of appliances and provides trusted access to the appliance ID database. The printing device broadcasts a public identifier, such as an appliance ID broadcast, as a beacon and that is discoverable by various devices, including the smartphone. In response to discovering the printing device via the broadcast appliance ID, the smartphone via the application program requests for a server to provide a user session for a user account correlated with the user ID to the printing device. The server, which is sometimes referred to as a "session bridge server" is trusted by both the user ID database and the appliance ID database and may assert legitimacy of both users and appliances for a plurality of users and appliances. The server creates attributes that allow the printing device to use its appliance ID to obtain the user session for the user account associated with the user ID and supported by the user ID database. The printing device requests for available user sessions or otherwise fetches the same from the server. For example, the printing device sends a request for available user sessions to the server and the session is established in response to verifying an appliance credential. In response to verification of the appliance credential provided as part of the request or that the server is otherwise aware of, the user session is enabled and is based on a spatial-temporal limit, for example, time threshold of greater than ten minutes and distance threshold of greater than thirty feet. The printing device may concurrently assume user sessions associated with multiple different users.

In accordance with a particular example, a target appliance is provided with access to user data in a user account correlated with a user ID that is stored or otherwise verified by the user-ID database, without the target appliance integrating with or federating the user-ID database. More specifically, the target appliance is provided the user session without providing tokens or other information directly to the user-ID database. The target appliance registers on an appliance-ID database that provides trusted access to a plurality of target appliances and stores appliance ID information. The target appliance provides its appliance ID to a communications-enabled device, such as via a beacon broadcast. The beacon may contain the appliance ID and/or a verifiable token, as further described herein. The target appliance accesses a list of available user sessions correlated with user accounts and the appliance ID from a server using an appliance credential. The list of available user sessions includes the new user session correlated with a respective user account of a user of the communications-enabled device and an authorization token for the new user session. The authorization token may be accessed by the server and from the user-ID database.

The user session may be initiated by the target appliance without a prompt for a user to provide user login information directly to the target appliance and without otherwise registering the target appliance as a trusted device with the user-ID database. Additionally, as the user session is spatial-temporal limited, the user session is terminated by the target appliance response to the session exceeding a threshold time and/or the target appliance and the communications-enabled device being a threshold spatial distance between the target appliance and the communications-enabled device, such as forty feet.

As used herein, verifiable token includes or refers to a token that is indicative of a secure identification of the appliance, such that the verifiable token is used to authenticate the target appliance and that may be time limited. The verifiable token may be provided to the communications-enabled device by the target appliance, such as in the initial beacon, and the communications-enabled device provides the same to the server when requesting the user session. An appliance credential includes or refers to data used to verify legitimacy of the appliance. The appliance credential may be provided by the target appliance to the server when requesting or otherwise accessing the list of available user sessions and the server may verify the appliance credential via the appliance-ID database. In some examples, the verifiable token is a specific type of appliance credential, which is provided by the communications-enabled device to the server as described above. An authorization token includes or refers to a token or data provided by the user-ID database to the server and that provides access to data of a user account. The data of the user account may be stored on a cloud server. A verification factor includes or refers to data that enables a new user session or enhances an access tier level of the new user sessions on the target appliance. Example verification factors include two-factor challenges and inputs on the target appliance and/or communication-enabled device.

A variety of examples are directed to a system that includes the above-described server. As may be appreciated, the server may include a plurality of different servers that are located at the same or different locations. The server, which may be commonly referred to as a cloud server, provides different functionalities. For ease of reference, the different functionalities are referred to as a different server, such as session bridge server and the authorization server, however, as may be appreciated, a single server may provide each of the described functionalities.

As a specific example, an apparatus includes the server having a memory circuit to store executable instructions and a processor circuit coupled to the memory circuit. The processor circuit executes instructions to provide various functionalities. For example, the processor circuit executes the instructions to provide other executable instructions to a communications-enabled device, the other executable instructions including a prompt for an input of user login information to verify a user account, such as a cloud account, and to initiate a user session supported by a user-ID database. The instructions are executed to receive, from the communications-enabled device, a request for providing the user session for the user account correlated with a user ID and a target appliance and retrieve, in response to the request, a user attribute from the user-ID database that stores user ID information and an appliance attribute from an appliance-ID database that stores appliance ID information. The instructions are further executed to create the requested user session for the user account with the target appliance using the retrieved user attribute and appliance attribute, and in response to a request for a list of available user sessions from the target appliance, verify an appliance credential of the target appliance. As previously described, the appliance credential may be provided by the target appliance in the request for the list of available user sessions. In response to verification of the appliance credential, the instructions are executed to transfer the requested user session to the target appliance as a new user session that is spatial-temporal limited, and therein provide authorization to the target appliance to access data in the user account correlated with the user ID without the target appliance using or having access to the user login information.

In various examples, the above described server further includes the user-ID database and/or appliance-ID database. For example, the memory circuit may store one or both databases, in different memory locations. The processor circuit may execute the instructions to access the user-ID database, verify input user login information as received from the communications-enabled device and using data in the user-ID database, and in response, verify that that user is authorized to access the user account and correlated services. The processor circuit may further or alternatively execute the instructions to access the appliance-ID database, verify the appliance credential as received from the target appliance and using data in the appliance-ID database, and transfer the new user session to the target appliance without adding the target appliance to the user account of the user stored in the user-ID database. The data from the user-ID database and/or the appliance-ID database may be or form part of the above-described user and appliance attributes. In related examples, the above-describe apparatus may further include the target appliance and/or the communications-enabled device.

Turning now to the figures, FIG. 1 illustrates an example method 100 for transferring a spatial-temporal limited user session, in accordance with the present disclosure. The method 100 may be implemented by a server, such as a session bridge server that bridges a user-ID database and an appliance-ID database, as further described by FIG. 2.

At 102, the method 100 includes receiving, at the server, a request for providing a user session correlated with a user ID and a target appliance. The request is provided, for example, by a communications-enabled device that includes processing circuitry, such as smartphone, a smartwatch, a laptop, or other types of portable communications devices. As further described herein, the communications-enabled device may be operating a server-based application program. The server-based application program may provide or otherwise be associated with user sessions that provide access to particular stored data and/or application functionalities. The user ID uniquely identifies the user account in the user-ID database.

The method 100, in response to the request for the requested user session, at 104, includes retrieving a user attribute from the user-ID database and retrieving an appliance attribute from the appliance-ID database. The user attribute and appliance attribute may be assets that allow the appliance to use its identity, such as an appliance ID and/or appliance credential, to obtain user sessions. As further described below, the user attribute may be an authorization token or a code that provides access to cloud data. At 106, the method further includes correlating the retrieved user attribute and the appliance attribute with the requested user session for a user account among the plurality of user accounts. For example, correlating the retrieved user attribute and appliance attribute may include authenticating a user correlated with the user account and the target appliance using the user attribute and the appliance attribute.

The method 100 further includes, at 108, transferring the requested user session to the target appliance as a new user session that is spatial-temporal limited and that is without the target appliance using user logic information. In various specific examples, the transfer may include providing authorization, such as the authorization token or code, to the target appliance to access data in the user account correlated with the user ID that is limited in time and/or space. In such examples, the server may request the authorization token for the user session from the user-ID database as a user attribute. Transferring the new user session may include providing the authorization token to the target device, such as providing an authorization code or token in the list of available user sessions. The target appliance may provide the authorization token to a cloud server to verify and get access to cloud data associated with the user account.

Additional examples may include setting, using user session information in the request and/or the retrieved attributes, the spatial-temporal threshold for limiting the new user session, an access tier, and a mechanism for accessing the new user session. Example spatial-temporal thresholds include a time threshold and/or a distance threshold indicative of a distance between the communications-enabled device and the target appliance.

In accordance with a number of examples, a plurality of user sessions are transferred to the target appliance at overlapping times. The plurality of user sessions are correlated with a subset of a plurality of user accounts and respectively with different users. The target appliance may established user sessions correlated with a subset of a plurality of user accounts at the overlapping times.

Various examples include additional authentication and/or authorization. For example, transferring the new user session to the target appliance may include verifying an appliance credential of the target appliance using the appliance attribute and in response to the request from the target appliance for available user sessions, the request including the appliance credential. The server may compare the appliance credential from the appliance-ID database to the appliance credential received from the target device, and authenticate the target appliance and/or otherwise authorize the new user session in response to the credentials matching. For example, the server provides authorization to the target appliance to access data in the user account correlated with the user ID that is spatial-temporal limited by a time threshold, and without the user logging into a version of the application on the target device or the session bridge providing user login information. In some more specific examples, the appliance attribute or another appliance attribute may be related to a verifiable token that is provided by the target appliance to the communications-enabled device during the discovery process. For example, the new user session may be transferred in response to verification of the verifiable token of the target appliance provided by the communications-enabled device compared to data from the appliance-ID database and/or otherwise accessed from a cloud server. The verifiable token includes or is indicative of a secure identification of the target appliance and may be time limited, such as having a threshold time that the verifiable token verifies identification of the target appliance. Additional authentication and/or authorization may occur using a verification factor that enables an access tier level for the new user session, as further described herein.

Figure 2:
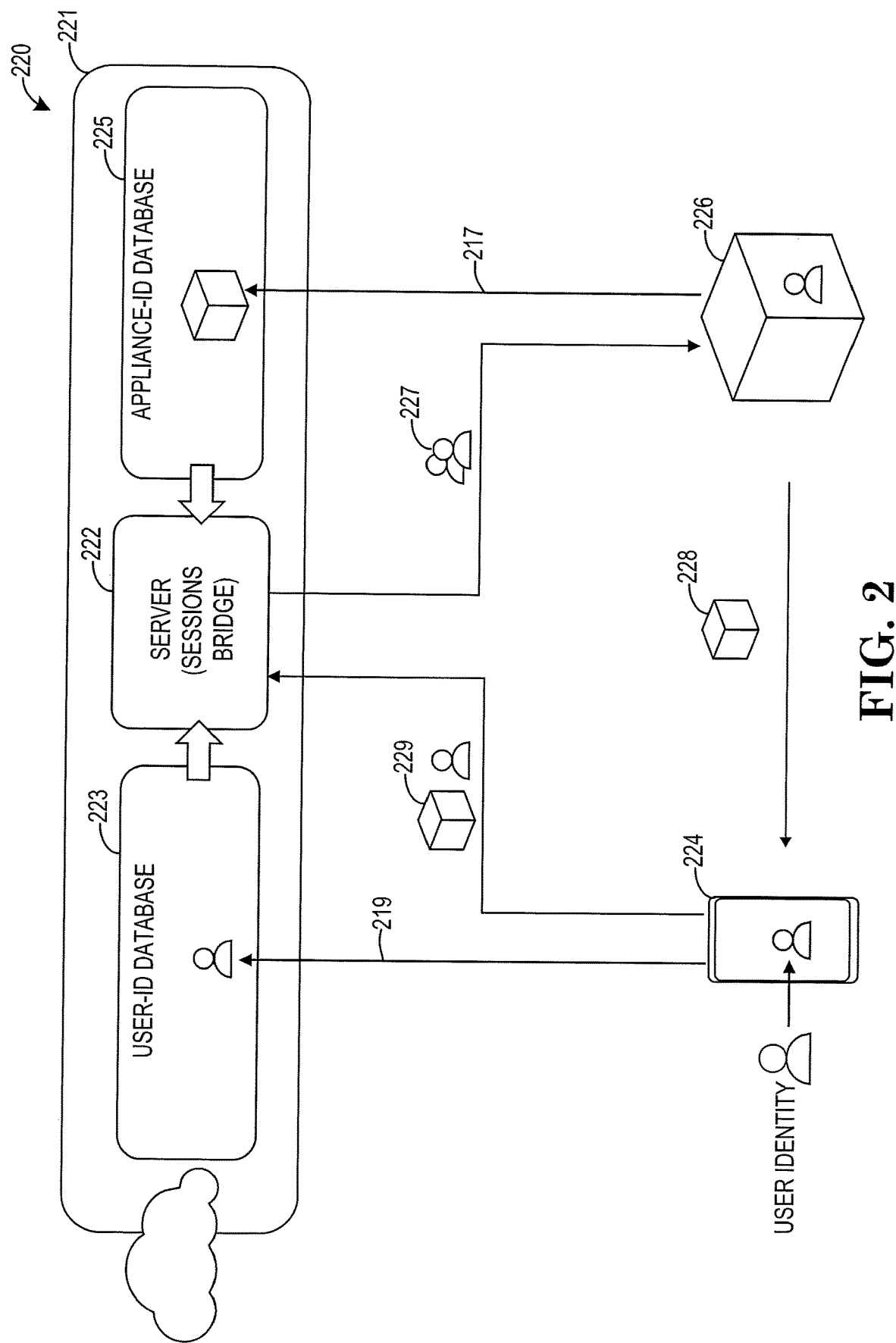
FIG. 2 illustrates an example environment for transferring a user session that is spatial-temporal limited, in accordance with the present disclosure.

FIG. 2 illustrates an example environment 220 for transferring a new user session that is spatial-temporal limited, in accordance with the present disclosure. As shown by FIG. 2, the environment 220 includes a server 222, a communications-enabled device 224, and a target appliance 226.

The server 222 acts as a bridge between the two disparate databases, a user-ID database 223 and an appliance-ID database 225. The user-ID database 223 uniquely identifies a user account of a user, and authenticates and/or authorizes use of services associated with the user account on a trusted cloud system 221. The appliance-ID database 225 uniquely identifies a target appliance, and validates legitimacy and provides trusted access to the target appliance. Each of the server 222, the user-ID database 223, and the appliance-ID database 225 may be part of the trusted cloud system 221 in some specific examples.

A plurality of appliances may register with the appliance-ID database 225. For example, at 217, the target appliance 226 registers with or on the appliance-ID database 225. Similarly, a plurality of users may register user accounts with the user-ID database 223. The user accounts are correlated with user data stored remotely via the trusted cloud system 221. As illustrated, as user logins into their user account associated with the user-ID database 223 by entering user login information to their communications-enabled device 224, at 219. The user login information is verified using the user-ID database 223 which authenticates and authorizes the user, via the communications-enabled device 224, to use services associated with the user account.

The target appliance 226 provides an appliance ID 228 to the communications-enabled device 224. For example, the target appliance 226 may periodically broadcast beacons having the appliance ID 228 over an available network that is accessible by the communications-enabled device 224. The appliance ID 228 may be a public ID and the network may include Bluetooth, near-field communications, Wi-Fi, ZigBee, Zwave and other types of communications. In various examples, the target appliance 226 may further or alternatively provide a verifiable token for security purposes, as further described below. In response to the appliance ID 228, the communications-enable device 224 requests for the server 222 to provide a user session correlated with the user ID and the appliance ID, at 229.

The server 222, acting as the bridge between the user-ID database 223 and appliance-ID database 225, creates assets for allowing the target appliance 226 to use its appliance ID to obtain the user session or user sessions with user data correlated one or a plurality of users. The server 222 is trusted by both the user-ID database 223 and the appliance-ID database 225 and asserts legitimacy of both the user and the target appliance 226. As described above, the assets may be created using a user attribute retrieved from the user-ID database 223 and an appliance attribute retrieved from the appliance-ID database 225. Such attributes may include an authorization token associated with the user account, a verifiable token and/or appliance credential associated with the target appliance 226, information about the user, such as the user's name, the appliance ID, a type of session, and the spatial-time limit, etc.

The target appliance 226 becomes aware of the available user session by requesting or otherwise fetching a list of available user sessions from the server 222, at 227. The request may include the appliance credential that the server 222 uses to verify legitimacy of the target appliance 226. Further, the list may include the authorization token(s) embedded within and used by the target appliance 226 to access the new user session.

In various examples, the new user session is enabled based on a variety of mechanisms, including automatically, user intervention, and two-factor challenges. For example, the server 222 correlates the attributes with the requested user session by locking the new user session to the appliance ID and setting various information including the spatial-temporal limit, an access tier, a state, and a mechanism for access elevation of the access tier. The spatial-temporal limit includes a time threshold and/or distance threshold, as previous described. The access tier includes different levels of access to user data of the user account. For example, the user may set different levels and provide control for the same. As a more specific example, a basic or level-1 access tier may be allow the target appliance 226 to fetch data to render the new user session on the target appliance 226, but optionally not enough to perform all actions or to access all user data correlated with the respective user. Another one or more levels may be used to provide other access tiers, although examples are not so limited and may include a full access tier. If a basic or level-1 access tier is provided, a mechanism for access tier elevation may be set that allows elevation from basic or level-1 access tier to additional access ties, such as full access. In some examples, the mechanism for access elevation is set to automatic, such that the full access is provided without additional action.

Other example mechanisms include a verification factor, such as a user-defined personal identification number (PIN) that is entered on the target appliance 226, an appliance-defined PIN or other type of code, an active acceptance using the application program on the communications-enabled device 224, and a proximity input. The user-defined PIN may be entered directly on the target appliance 226, and which uses active notification, such as a push message, on the application program to trigger application input. The appliance-defined PIN or other code includes a display of the PIN or code on a display screen of the target appliance 226. The user enters or scans the PIN or other code using the communications-enabled device 224. The active acceptance may include a user confirmation directly on a user interface of the communications-enabled device 224, and which uses an active notification. A proximity input may include an action when the communications-enabled device 224 is within a threshold distance of the target appliance 226, such as tapping or shaking the communications-enabled device 224 or using received signal strength indicator (RSSI) to trigger state changes.

Figure 3:
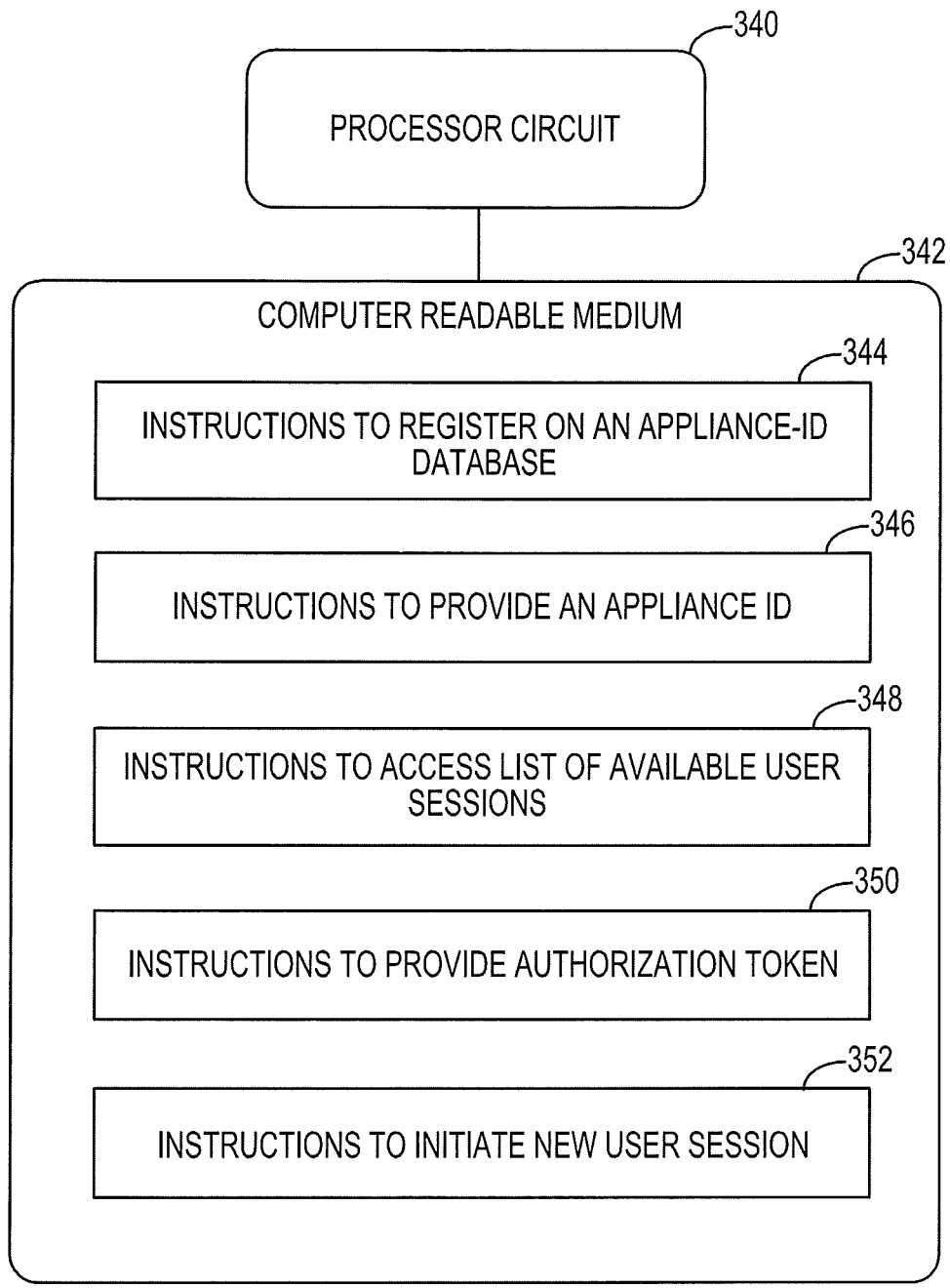
FIG. 3 illustrates an example computing device including non-transitory computer-readable medium storing executable code, in accordance with the present disclosure.

FIG. 3 illustrates an example computing device including non-transitory computer-readable medium storing executable code, in accordance with the present disclosure. The computing device, in accordance with examples herein, includes a target appliance such as the target appliance 226 illustrated by FIG. 2.

The computing device has a processor circuit 340 and computer readable medium 342 storing a set of instructions 344, 346, 348, 350, 352. The computer readable medium 342 may, for example, include read-only memory (ROM), random-access memory (RAM), electrically erasable programmable read-only memory (EEPROM), Flash memory, a solid state drive, and/or discrete data register sets. At 344, the computing device may register on an appliance-ID database that provides trusted access to a plurality of target appliances and that stores appliance ID information. The computing device may communicate with the appliance-ID database and/or another computing device storing the appliance-ID database may be in communication with the computing device, in a wired or wireless manner. At 346, an appliance ID is provided, via a network, to a communications-enabled device that includes processing circuitry. As previously described, the computing device, which includes the target appliance, provides a beacon that has the appliance ID and/or a verifiable token and which the communications-enabled device receives, and in response to user input, requests a user session with the target appliance using data in the beacon.

At 348, a list of available user sessions correlated with user accounts and the appliance ID may be accessed from a server using an appliance credential. The list of available user sessions includes a new user session correlated with a respective user account of the user of the communications-enabled device and an authorization token for the new user session. In response, at 350, the authorization token may be provided to the server that stores information correlated with a plurality of user accounts and to initiate the new user session. As previously described, the server, which may be referred to as a cloud server, may include the same or different circuitry than the server that bridges the appliance-ID database and the user-ID database. Additionally, the plurality of user accounts include the respective user account of the user and the new user session includes use of the user ID correlated with the user to access data in the respective user account that is spatial-temporal limited and provided without input of the user login information to the target appliance. In a number of specific examples, at 352, the new user session is initiated using the user ID and the authentication token without a prompt for the user login information and the new user session is terminated in response to exceeding the spatial-temporal limit(s), such as the session exceeding a threshold amount of time and/or exceeding a threshold distance between the target appliance and the communications-enabled device, which may be a user-configured distance. For example, user information correlated with the respective user account may be received from the server using the authorization token, as described above. The user information, in specific examples, includes user settings, workflows and past usage information, such as settings related to the target appliance. As an example, a printer may access user settings, workflows, and past usage information related to printing documents. The processor circuit 340 may carry out the operations stored on the computer readable medium, including those operations characterized by way of instructions 344, 346, 348, 350, 352 and as may include other operations or activities as characterized herein.

In various specific examples, the processor circuit 340 may carry out additional or more specific operations stored on the computer readable medium 342. For example, the instructions are executable to initiate the new user session or to enhance an access tier level of the new user session in response to a verification factor. Additionally, the instructions are executable to initiate a plurality of new user sessions, including the new user session, correlated with or associated with a plurality of different users and user accounts, wherein the plurality of new user sessions overlap in time.

Figure 4:
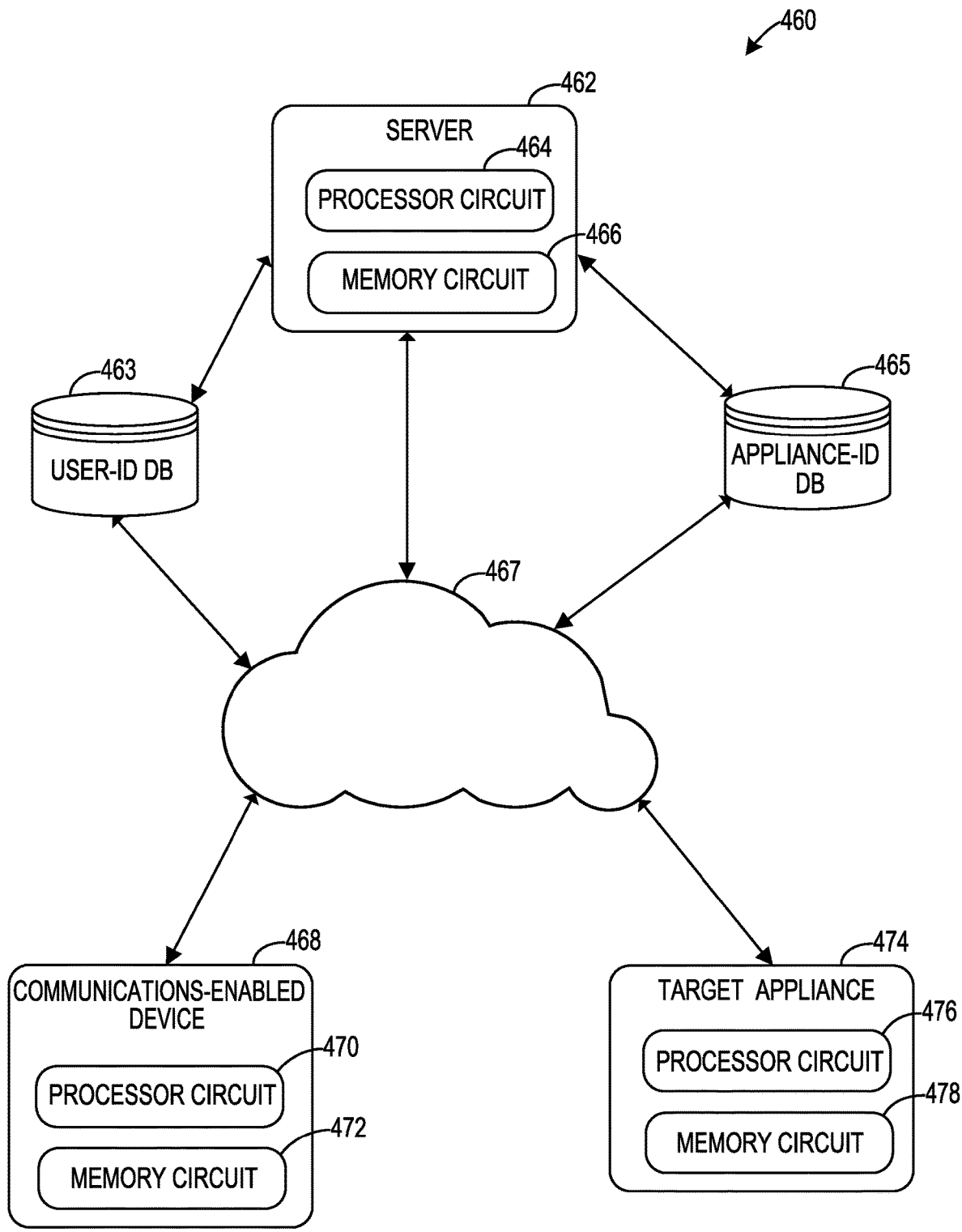
FIG. 4 illustrates an example apparatus for transferring a spatial-temporal limited user session, in accordance with the present disclosure.

FIG. 4 illustrates an example apparatus 460 for transferring a spatial-temporal limited user session, in accordance with the present disclosure. The apparatus 460 includes the server 462, a communications-enabled device 468, and a target appliance 474 which may be in communications via the cloud system 467, such as the server 222, communications-enabled device 224, and the target appliance 226 previously described in connection with FIG. 2. As previously described, the server 462 acts as a bridge between the user-ID database 463 and the appliance-ID database 465 to provide user sessions correlated with user accounts of the user-ID database 463 to target appliances that are verified or registered on the appliance-ID database 465.

Similarly with that described in connection with FIG. 3, each of the server 462, the communications-enabled device 468, and the target appliance 474 have a processor circuit 464, 470, 476 and computer readable medium, such as the illustrated memory circuits 466, 472, 478 respectively storing a set of instructions. Each of the computer readable mediums may, for example, include ROM, RAM, EEPROM, Flash memory, a solid state drive, and/or discrete data register sets. The processor circuits 464, 470, 476 may carry out the operations stored on the computer readable medium.

In specific examples, the processor circuit 464 of the server 462 executes instructions to provide executable instructions to the communications-enabled device 468. The provided executable instructions include a prompt for an input of user login information to verify a user account and to initiate a user session supported by the user-ID database 463. In such examples, the executable instructions may be provided as part of an application program executing on the communications-enabled device 468 and communicated via the cloud system 467. The processor circuit 464 of the server 462 executes instructions to receive, from the communications-enabled device 468, a request for providing the user session for the user account to the target appliance 474. In response to the request, the instructions are executed to retrieve a user attribute from the user-ID database 463 that stores user ID information and an appliance attribute from the appliance-ID database 465 that stores appliance ID information, and to create the requested user session for the user account with the target appliance 474 using the retrieved user attribute and appliance attribute. In response to a request for a list of available user sessions from the target appliance 474, the processor circuit 464 of the server 462 executes instructions to verify an appliance credential of the target appliance 474. As previously described, the target appliance 474 may provide the appliance credential in the request for the list of available user sessions and which is verified using data accessed by the server 462 in the appliance-ID database 465. In response to verification of the appliance credential, the instructions are executed to transfer the requested user session to the target appliance 474 as a new user session that is spatial-temporal limited, and therein provide authorization to the target appliance 474 to access data in the user account correlated with the user ID without the target appliance 474 using the user login information, as previously described.

In a number of specific examples, the memory circuit 466 of the server 462 stores one or both of the user-ID database 463 and the appliance-ID database 465. In other examples, one or both of user-ID database 463 and the appliance-ID database 465 are stored on separated servers that are accessible by the server 462 via the cloud system 467. As a specific example, the memory circuit 466 stores the user-ID database 463 including the user ID information and user attributes correlated with a plurality of user accounts and a plurality of users. The plurality of user accounts and the plurality of users includes the user account and the user. In such an example, the instructions are executed by the processor circuit 464 to access the user-ID database 463, to verify the input user login information received from the communications-enabled device 468 using data in the user-ID database 463, and in response, verify the user is authorized to access the user account and correlated services, and provide the user attribute for creating the requested user session. In other examples and/or in addition, the memory circuit 466 stores the appliance-ID database 465 including the appliance ID information of a plurality of target appliances and appliance attributes associated with the plurality of target appliances. The plurality of target appliances includes the target appliance 474. In such an example, the instructions are executed by the processor circuit 464 to access the appliance-ID database 465, to verify the appliance credential, received from the target appliance 474, using data in the appliance-ID database 465, and to transfer the new user session to the target appliance 474 without adding the target appliance 474 to the user account of the user in the user-ID database 463.

The apparatus 460 may additionally include one or both of the target appliance 474 and the communications-enabled device 468. For example, the target appliance 474 includes non-transitory computer-readable medium storing a set of instructions executable by another processor circuit 476 to cause the target appliance 474 to register on the appliance-ID database 465, to provide, using a network communication, an appliance ID to the communications-enabled device 468, to request the list of available user sessions associated with the appliance ID from the server 462, and to initiate the new user session using data provided from the server 462 in the list of available user sessions. As previously described, an authentication token may be accessed from the user-ID database 463 by the server 462 and provided to the target appliance 474 as part of the list of available user sessions. The target appliance 474 uses the authorization token to gain access to user data associated with a user account.

Figure 5:
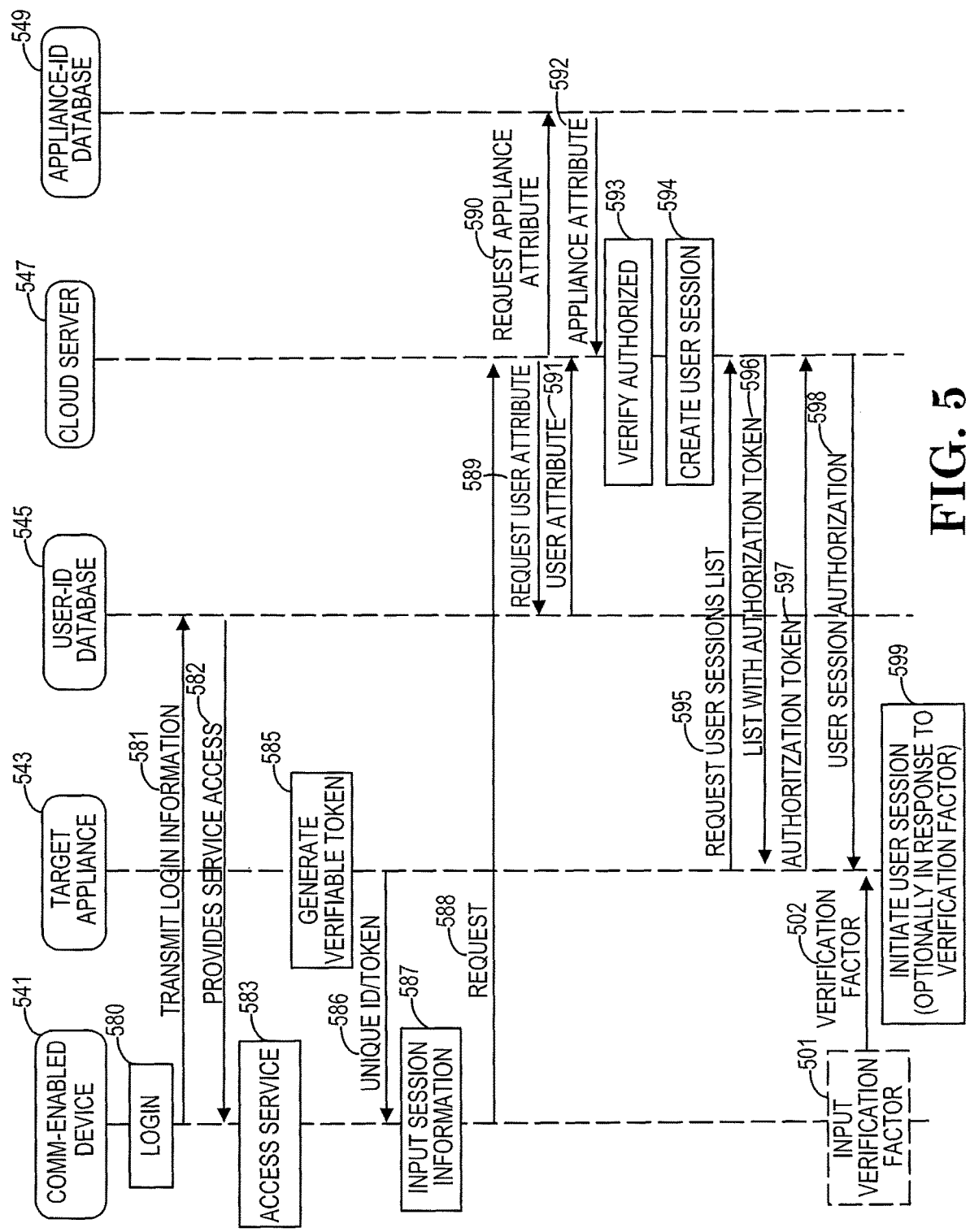
FIG. 5 illustrates an example timing diagram for transferring a spatial-temporal limited user session, in accordance with the present disclosure.

FIG. 5 illustrates an example timing diagram for transferring a spatial-temporal limited user session, in accordance with the present disclosure. As may be appreciated, FIG. 5 illustrates a specific example, and examples in accordance with the present disclosure are not limited to the illustrated timing diagram and the user session may be provided with alterations in order and number of transfers of data. The various arrows indicators used in the timing diagram depict transfer of data between different entities in the environment, such as the environment 220 illustrated by FIG. 2 to initiate a new user session on a target appliance. The different entities include the communications-enabled device 541, the target appliance 543, the user-ID database 545, the cloud server 547, and the appliance-ID database 549, such as previously described in connection with FIGS. 2 and 4. The cloud server 547 may include a plurality of servers that are distributed in a cloud system and/or environment. The cloud server 547 may store and access data in the user-ID database 545 and the appliance-ID database 549. Additionally, the cloud server 547 may include the session bridge server and an additional one or more cloud servers that provide access to user account data.

The user session may be initiated by the communications-enabled device 541. For example, responsive to a user providing user login information, at 580, to a program application running on the communications-enable device 541, at 581, the communications-enabled device 541 may transmit the user login information or portions thereof to a user-ID database 545 for verification of the user and access to the user account. Responsive to verification, at 582, the user-ID database 545, via a cloud server having access thereto, provides access to services associated with the user account to the communications-enabled device 541. The access may be provided responsive to verifying legitimacy of the user and/or that the communications-enabled device 541 is a trusted device using data on the user-ID database 545. The communications-enabled device 541, at 583, accesses the services provided by or otherwise associated with the user account.

In various examples, the target appliance 543 generates a verifiable token, at 585, and communicates the verifiable token and an appliance ID to the communications-enabled device 541, at 586. The verifiable token may be indicative of a secure identification of the target appliance 543, such as a token derived from or using a security key or a cryptographic key. The key may be known by the cloud server 547, such as via registration processes, and which is used to derive the respective verifiable token. As a specific example, the verifiable token is based on the appliance ID, a security key/cryptographic key or a random value generated by the target appliances 543, sometimes referred to as a "signature," and a time-stamp of the target appliance 543. The target appliance 543, at 586, communicates the appliance ID and/or verifiable token. The communication may include a periodic beacon that is broadcast by the target appliance 543. In response to receiving the communication, at 587, the communications-enable device 541 provides a notification of an identified nearby target appliance to the user and, optionally, allows for the user to input session information. The session information may include a user verification to initiate the user session with the target appliance 543 and, optionally, information on the specific user session, such as a time threshold, a distance threshold, access tier, states, and mechanisms for access tier elevation. Although examples are not so limited and the various specific session information may be predefined. In response to verification, at 588, the communications-enabled device 541 sends a request for a user session with the target appliance 543 to the cloud server 547, such as specifically to the session bridge server.

Although not all examples are so limited, and the communications-enabled device 541 may search for nearby target appliances. For example, the communications-enabled device 541 in response to the access to services, at 583, and/or responsive to a user input may communicate a request, such as a beacon, to identify nearby target appliances. In response receiving the request, the target appliance 543 generates the verifiable token, at 585, and then transmits the appliance ID and/or the verifiable token to the communications-enabled device 541.

The cloud server 547 may optionally validate the verifiable token. For example, the session bridge server may receive the request having the verifiable token. The session bridge server may be aware of the security key/cryptographic key or a random value, such as may be stored in the appliance-ID database 549 and/or another authentication server in the cloud environment and which is used to validate the verifiable token. In other examples, the target appliance 543 may verify the verifiable token, such as by the cloud server 547 communicating the verifiable token from the request, at 588, to the target appliance 543 and the target appliance 543 communicating validation, or not, in response.

Responsive to the request, and optionally the validation of the verifiable token, the cloud server 547, at 589 and at 590, requests a user attribute from the user-ID database 545 and an appliance attribute from the appliance-ID database 549. In response to the requests, the user attribute from the user-ID database 545 and the appliance attribute from the appliance-ID database 549 is provided to the cloud server 547, at 591 and 592. As previously described, such attributes may include the cloud server 547 verifying legitimacy of the communications-enabled device 541 and the target appliance 543, such as the authorization token of the user or the user account, the verifiable token of the target appliance 543, information about the user, such as the users name or label, the appliance ID, the type of session, and the spatial-temporal limit. In response, the cloud server 547 may verify authorization for the user session, at 593, and create the new user session, at 594.

The target appliance 543 may periodically send requests to the cloud server 547 for a list of available user sessions, such as the illustrated request at 595. In response to the request, the cloud server 547 identifies a device credential in the request and verifies legitimacy of the target appliance 543 using data in the appliance-ID database 549, which may be the appliance attribute previously obtained, and, at 596, sends the list of the available user sessions with the authorization token to the target appliance 543. The target appliance 543, at 597, exchanges the authorization token to the cloud server 547 for user session authorization, at 598. In specific examples, the target appliance 543 exchanges the authorization token to a cloud server 547, which may be a different cloud server than the session bridge server that stores user data associated with the user account and the authorization token provides the access to the user data. In other examples and/or in addition, the cloud server 547 receives authorization token and sends an ephemeral access token that provides the temporal-spatial limited access to user data of the user account.

The target appliance 543 has access to the new user session, which includes the user ID and access to user data associated with the user ID, for a specific amount of time that may be based on the user input, system definitions based on the type of session, and other assertions including distance between the target appliance 543 and the communication-enabled device 541. As may be appreciated, many appliances are used in public areas and by time or spatially limiting the access, may provide the user with additional security for the user data and/or otherwise protect their private information.

In various specific examples, additional verification may be used to enhance the access tier level provided to the target appliance 543. In response to the new user session, at 598, a verification factor and/or process may be used to increase the level of access provided to the target appliance 543. As a specific example illustrated by FIG. 5, at 501, a verification factor is input to the communications-enabled device 541 and, at 502, the verification factor is sent to the target appliance 543. In response, at 599, the new user session is initiated or the access level of the new user session is otherwise enhanced. As previous described, the verification factor may include two-factor challenges and inputs on the target appliance 543 and/or communication-enabled device 541.

Terms to exemplify orientation, such as upper/lower, left/right, top/bottom and above/below, may be used herein to refer to relative positions of elements as shown in the figures. It should be understood that the terminology is used for notational convenience and that in actual use the disclosed structures may be oriented different from the orientation shown in the figures. Thus, the terms should not be construed in a limiting manner.

Various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, circuit and/or other circuit-type depictions. For instance, reference numerals 462, 468, 474 of FIG. 4 depict a block/module as described herein. Such circuits or circuitry are used together with other elements to exemplify how certain examples may be carried out in the form or structures, functions, operations, activities, etc. In certain of the above-discussed examples, modules are discrete logic circuits or programmable logic circuits for implementing these operations/activities, as may be carried out in the approaches shown in FIG. 1. In certain examples, such a programmable circuit may include memory circuitry for storing and accessing a program to be executed as a set (or sets) of instructions. Additionally and/or alternatively, the program may be used as configuration data to define how the programmable circuit is to perform, and an algorithm or process with respect to FIGS. 3-4 is used by the programmable circuit to perform the related, functions, operations, activities, etc. Depending on the application, the instructions, configuration data, and/or process may be implemented in logic circuitry, with the instructions, whether characterized in the form of object code, firmware or software) stored in and accessible from a memory (circuit).

Based upon the above discussion and illustrations, the various modifications and changes may be made to the various examples without strictly following the examples and applications illustrated and described herein. For example, methods as depicted in the Figures may involve steps carried out in various orders, with various aspects of the examples herein retained, or may involve fewer or more steps. For instance, the target appliance 226 illustrated by FIG. 2 may include the processor circuit 340 and computer readable medium 342 illustrated by FIG. 3. As another example, the server 222 illustrated by FIG. 2 or the server 462 illustrated by FIG. 4 may implement the process illustrated by FIG. 1. Such modifications do not depart from the true spirit and scope of various aspects of the disclosure, including aspects set forth in the claims.

What is claimed is:

1. A method, comprising:
receiving, at a server from a communications-enabled device that includes processing circuitry, a request for providing a user session correlated with a user identifier (ID) and a target appliance;
in response to the request and for the requested user session:
retrieving a user attribute from a user-ID database that stores user ID information for a plurality of user accounts, and retrieving an appliance attribute from an appliance-ID database that stores appliance ID information; and
correlating the retrieved user attribute and appliance attribute with the requested user session for a user account from among the plurality of user accounts; and
transferring a plurality of new user sessions, including the requested user session, to the target appliance at overlapping times, the new user sessions spatial-temporal limited, without the target appliance using user login information, and are correlated with the plurality of user accounts and a plurality of different users.

2. The method of claim 1, wherein the target appliance is another communications-enabled device having processing circuitry, and further including:
correlating the retrieved user attribute and appliance attribute by authenticating a user correlated with the user account and the target appliance using the user attribute and the appliance attribute, wherein the user ID uniquely identifies the user account in the user-ID database and the request for providing the user session includes an appliance ID of the target appliance that uniquely identifies the target appliance in the appliance-ID database; and
setting, using user session information in the request, a spatial-temporal threshold for limiting the new user session, an access tier, and a mechanism for accessing the new user session.

3. The method of claim 1, wherein transferring the new user session to the target appliance further includes, verifying an appliance credential of the target appliance using the appliance attribute in response to a request from the target appliance for available user sessions, the request including the appliance credential, and providing authorization to the target appliance to access data in the user account correlated with the user ID that is spatial-temporal limited by a time threshold.

4. The method of claim 1, further including transferring the new user session in response to verification of a verifiable token of the target appliance and using data from the appliance-ID database, the verifiable token being indicative of secure identification of the target appliance.

5. The method of claim 1, the method further including, by the server:
    requesting an authorization token for the user session from user-ID database; and
    transferring the new user session further includes providing the authorization token to the target appliance.

6. The method of claim 1, wherein the user-ID database stores user ID information of the plurality of user accounts correlated with the plurality of users.

7. A non-transitory computer-readable medium storing a set of instructions executable by a processor circuit to cause a computing device to:
    register on an appliance-identifier (ID) database that provides trusted access to a plurality of target appliances and that stores appliance ID information;
    provide, via a network, an appliance ID to a communications-enabled device that includes a processing circuit;
    access a list of available user sessions correlated with user accounts and the appliance ID from a server using an appliance credential, the list of available user sessions including a new user session correlated with a respective user account of a user of the communications-enabled device and an authorization token for the new user session; and
    provide the authorization token to the server that stores information correlated with a plurality of user accounts to initiate the new user session, the plurality of user accounts including the respective user account and the new user session including use of a user ID correlated with the user to access data in the respective user account that is spatial-temporal limited and without use of user login information.

8. The non-transitory computer-readable medium of claim 7, wherein the instructions are executable to initiate the new user session without a prompt for the user login information and to terminate the new user session in response to exceeding a threshold amount of time.

9. The non-transitory computer-readable medium of claim 7, wherein the instructions are executable to wirelessly communicate the appliance ID and a verifiable token to the communications-enabled device in response to a received wireless communication from the communications-enabled device, and the instructions executable to initiate the new user session further include instructions executable to receive, from the server, user information correlated with the respective user account using the authorization token, the user information including user settings, workflows, and past usage information.

10. The non-transitory computer-readable medium of claim 7, wherein the instructions are executable to initiate the new user session in response to a verification factor.

11. The non-transitory computer-readable medium of claim 7, wherein the instructions are executable to initiate a plurality of new user sessions, including the new user session, correlated with a plurality of different users and user accounts, wherein the plurality of new user sessions overlap in time.

12. An apparatus including a server, the server comprising:
    a memory circuit operable to store executable instructions; and
    a processor circuit coupled to the memory circuit, wherein the processor circuit executes the instructions to:
        provide executable instructions to a communications-enabled device, the executable instructions including a prompt for an input of user login information to verify a user account and to initiate a user session supported by a user-identifier (ID) database;
        receive, from the communications-enabled device, a request for providing the user session for the user account correlated with a user ID and a target appliance;
        retrieve, in response to the request, a user attribute from the user-ID database that stores user ID information and an appliance attribute from an appliance-ID database that stores appliance ID information;
        create the requested user session for the user account with the target appliance using the retrieved user attribute and appliance attribute;
        in response to a request for a list of available user sessions from the target appliance, verify an appliance credential of the target appliance; and
        in response to verification of the appliance credential, transferring the requested user session to the target appliance as a new user session that is spatial-temporal limited, and therein provide authorization to the target appliance to access data in the user account correlated with the user ID without the target appliance using the user login information.

13. The apparatus of claim 12, wherein the memory circuit stores the user-ID database, the user-ID database including the user ID information and user attributes correlated with a plurality of user accounts and a plurality of users, the plurality of user accounts and the plurality of users including the user account, and the processor circuit executes the instructions further to:
    access the user-ID database;
    verify the input user login information, received from the communications-enabled device, using data in the user-ID database; and
    in response, verify the user is authorized to access the user account and correlated services, and provide the user attribute for creating the requested user session.

14. The apparatus of claim 12, wherein the memory circuit stores the appliance-ID database, the appliance-ID database including appliance ID information of a plurality of target appliances, including the target appliance, and appliance attributes associated with the plurality of target appliances, and the processor circuit executes the instructions further to:
    access the appliance-ID database;
    verify the appliance credential, received from the target appliance, using the appliance attribute in the appliance-ID database; and
    transfer the new user session to the target appliance without adding the target appliance to the user account of a user.

15. The apparatus of claim 12, the apparatus further including the target appliance that includes non-transitory computer-readable medium storing a set of instructions executable by another processor circuit to cause the target appliance to:
  register on the appliance-ID database;
  provide, using a network communication, an appliance ID to the communications-enabled device;
  request the list of available user sessions associated with the appliance ID from the server; and
  initiate the new user session using data provided from the server in the list of available user sessions.

\* \* \* \* \*